US008996816B2

(12) United States Patent
Donley et al.

(10) Patent No.: US 8,996,816 B2
(45) Date of Patent: Mar. 31, 2015

(54) METHOD AND APPARATUS FOR SELECTIVELY BYPASSING A CACHE FOR TRACE COLLECTION IN A PROCESSOR

(75) Inventors: Greggory D. Donley, San Jose, CA (US); Benjamin Tsien, Fremont, CA (US); Vydhyanathan Kalyanasundharam, San Jose, CA (US); Patrick N. Conway, Los Altos, CA (US); William A. Hughes, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1179 days.

(21) Appl. No.: 12/941,576

(22) Filed: Nov. 8, 2010

(65) Prior Publication Data

US 2012/0117330 A1 May 10, 2012

(51) Int. Cl.
*G06F 12/00* (2006.01)
*G06F 11/36* (2006.01)
*G06F 12/08* (2006.01)

(52) U.S. Cl.
CPC ........ *G06F 11/3636* (2013.01); *G06F 11/3648* (2013.01); *G06F 12/0888* (2013.01)
USPC .................................. 711/138; 711/E12.021

(58) Field of Classification Search
USPC ......................................................... 711/138
See application file for complete search history.

(56) References Cited

U.S. PATENT DOCUMENTS

| 6,397,382 | B1 * | 5/2002 | Dawson ......................... 717/130 |
| 6,530,076 | B1 * | 3/2003 | Ryan et al. .................... 717/128 |
| 2003/0093641 | A1 * | 5/2003 | Kahn et al. .................... 711/170 |

* cited by examiner

*Primary Examiner* — Larry MacKall
(74) *Attorney, Agent, or Firm* — Volpe and Koenig, P.C.

(57) ABSTRACT

A method and apparatus for selectively bypassing a cache in a processor of a computing device are disclosed. A mechanism to provide visibility to transactions on the core to a cache interface (e.g., an L3 cache interface) in a trace controller buffer (TCB) for debugging purposes, by causing selected transactions, which would otherwise be satisfied by the cache, to bypass the cache and be presented to the memory system where they may be logged in the TCB is described. In an embodiment of the invention, there is provided a method for providing processing core request visibility comprising bypassing a higher level cache in response to a processing core request, capturing the processing core request in a TCB, providing a mask to filter the processing core request, and returning a transaction response to a requesting processing core.

20 Claims, 3 Drawing Sheets

METHOD AND APPARATUS FOR SELECTIVELY BYPASSING A CACHE FOR TRACE COLLECTION IN A PROCESSOR

FIELD OF INVENTION

This application is related to collection of memory traffic traces using a trace buffer mechanism.

BACKGROUND

Modern processors, such as, for example, central processing unit (CPU) chips, often contain multiple processing cores, multiple levels of cache hierarchy and complex interfaces between many different blocks of logic. Attempting to debug failures in this environment may be very difficult and time consuming. Often scan dumps, which provide an instantaneous view of the state of the processor, may provide some insight as to the cause of a failure when one is detected. However, many times, the events that cause the failure actually occur much earlier than (prior to) the point at which the failure is detected and the state is captured. As a result, the processor state captured via scan at the time of detection contains little or no useful information regarding the cause of the failure.

An additional tool to help debug failures is a trace capture buffer (TCB) that keeps track of the sequence of memory references that the processor makes. The TCB may record a limited sequence of transactions arriving at the memory system. This buffer may either be written in a loop where older transactions are replaced by new ones when the buffer is full, or the processor may be paused and the buffer written to DRAM memory to extend its storage capability.

Even with the TCB, there are limits to the debug information that may be captured. For example, cache memory (e.g., the L3 cache), which is located between the processing cores and the memory system, may complete some core requests autonomously without generating any transactions to the memory system. As a result, these operations, which may be important for debugging a particular failure, do not reach the TCB and are unobservable.

SUMMARY OF EMBODIMENTS

A method and apparatus for selectively bypassing a cache in a processor of a computing device are disclosed. A mechanism to provide visibility to transactions on the core to a cache interface (e.g., an L3 cache interface) in the TCB for debugging purposes, by causing selected transactions, which would otherwise be satisfied by the cache, to bypass the cache and be presented to the memory system where they may be logged in the TCB is described.

In an embodiment of the invention, there is provided a method for providing processing core request visibility comprising bypassing a higher level cache in response to a processing core request, capturing the processing core request in a trace capture buffer (TCB), providing a mask to filter the processing core request, and returning a transaction response to a requesting processing core.

BRIEF DESCRIPTION OF THE DRAWINGS

A more detailed understanding may be had from the following description, given by way of example in conjunction with the accompanying drawings wherein.

DETAILED DESCRIPTION OF EMBODIMENTS

While the examples herein describe specific types of caches (for example, an L3 cache) and devices associated with caches (L3 controller, etc.), embodiments of this invention applies to any type of cache and devices associated with caches, wherein there may be multiple caches operating at multiple levels for multiple purposes. The term "memory" as used herein, refers to any type of storage including but not limited to dynamic random access memory, flash memory, disk, or the like.

A mechanism to provide visibility to transactions (e.g., read requests, write requests, and the like) on the core to a cache interface (e.g., an L3 cache interface) in the TCB for debugging purposes, by causing selected transactions, which would otherwise be satisfied by the cache, to bypass the cache and be presented to the memory system where they may be logged in the TCB is described below.

Figure 1:
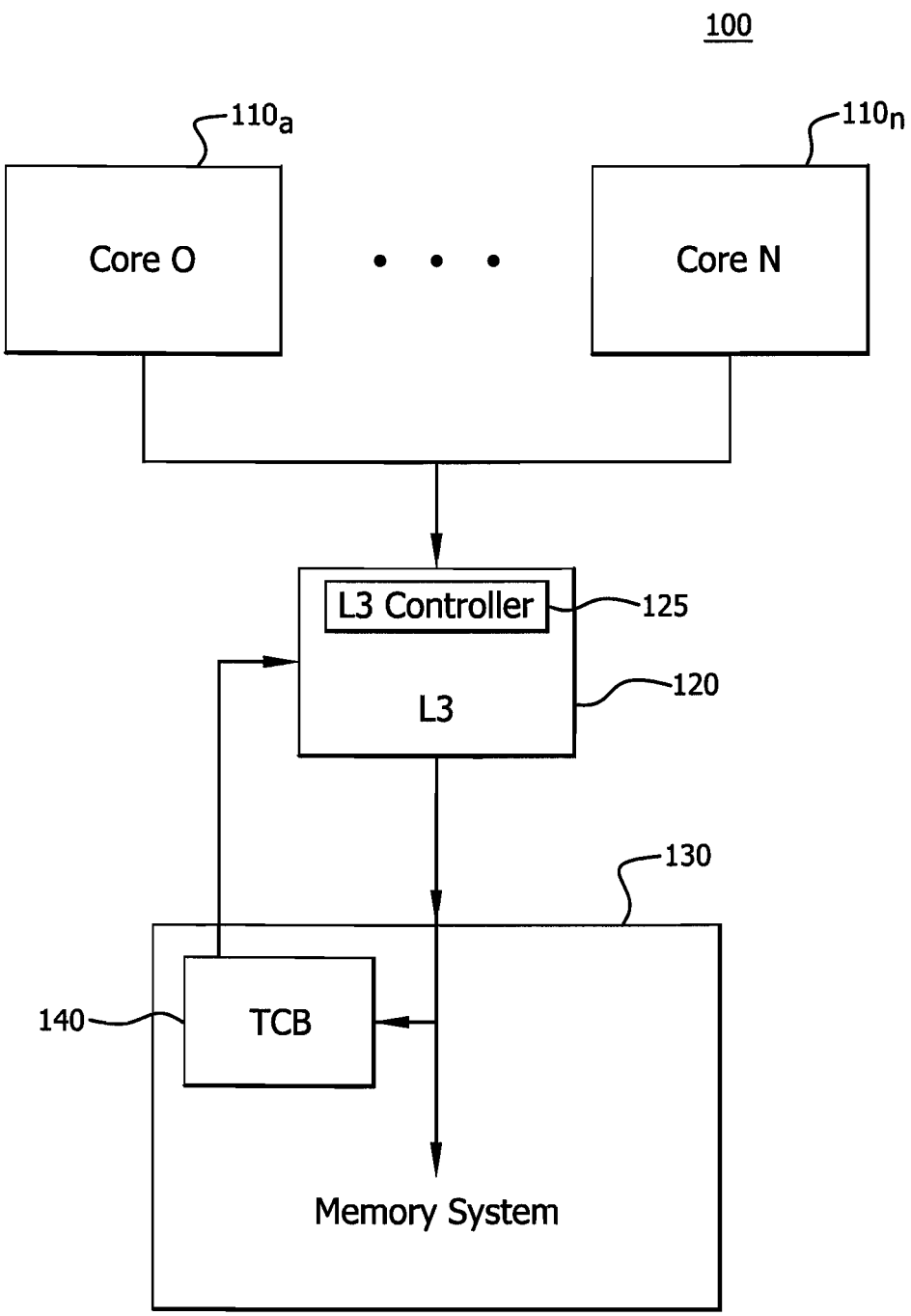
FIG. 1 shows an example of a multi-core processor configured to implement an embodiment the invention.

FIG. 1 shows an example of a processor 100 which, in the exemplary embodiment is a multi-core processor (100) configured to implement an embodiment of the invention. The processor (100) comprises multiple cores (110a-110n), wherein the cores 110a-110n are coupled to a cache (for example, an L3 cache (120)). The L3 cache (120) is connected to a memory system (130) that includes TCB (140).

One or more requests (described more fully below) from the multiple cores (110a-100n) are presented to the L3 controller (125) which tries to complete them via the L3 cache (120). Read or write operations look up the L3 tags and if the address is found in an appropriate state for the memory access, the L3 cache provides the data back to the requesting core and the transaction is completed.

Similarly for victim (wherein a victim is an element that is removed from one cache to be written into a lower level cache), the L3 cache stores the address in the tag array and stores the associated data in the data array. If the set of data determined by the particular tag index into main memory contains no invalid locations, an L3 victim may be generated and forwarded to the memory system (130). This invention is concerned with propagating these read hits to a cache, and victim writes into the cache, to a memory system where they may be traced (that is, the cache is bypassed).

Figure 2:
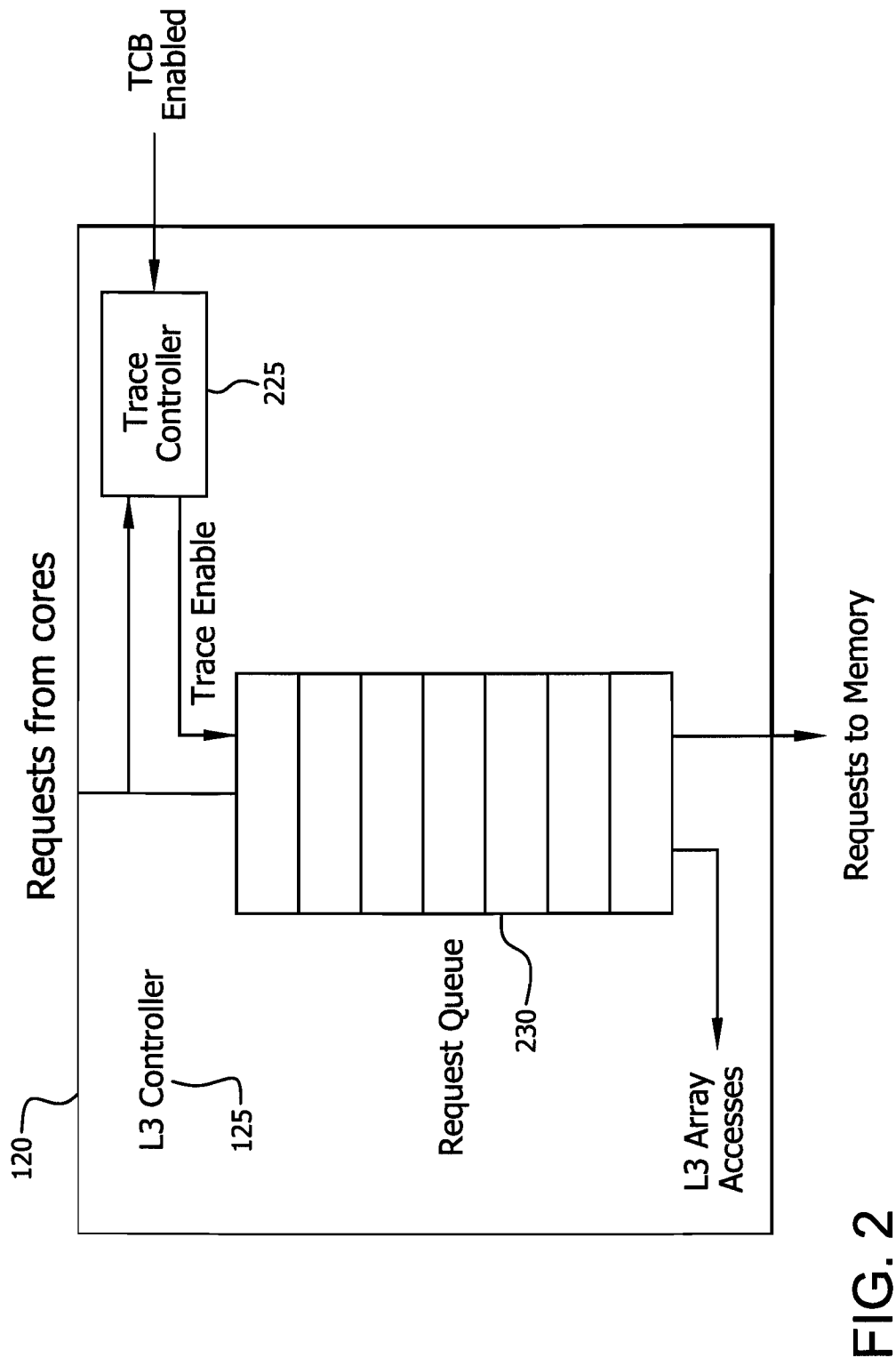
FIG. 2 shows an example of the L3 cache of the processor in FIG. 1.

FIG. 2 shows an example of the cache (e.g., L3 cache (120)) of the processor (100) in FIG. 1. The L3 cache (120) includes a controller (for example, L3 controller (125)). The L3 controller (210) is coupled to a trace controller (225) and a request queue (230). The trace controller (225) is also coupled to the request queue 230.

Memory access requests come into the L3 controller (210) where the trace controller (225) examines each request to determine if (1) the request matches any of the trigger conditions (e.g., conditions that will trigger tracing). One common example of a trigger is to collect all coherent memory accesses, including reads, writes, clean victims and dirty victims to enable bypassing, and if bypassing is already enabled, either due to triggering by an earlier request or because the TCB enable is active (a TCB indicator or bit is set) and the trace controller (225) is configured to use it as a trigger, the request is matched against the trace controller filters. The behavior of the trace collection mechanism is very similar to an on-chip logic analyzer which can be programmed to capture events on a bus which meet a set of predefined rules to determine if the request should be bypassed. Once tracing has been triggered and if the request matches the trace controller filter, the request is marked with a "trace enable" bit (or indicator) when it is loaded into the request queue (230). The L3 controller (125) normally services each transaction in the request queue by looking up its address in the L3 array and responding with data (data corresponding to the request, i.e., data that satisfies the request) if the state is appropriate.

For read accesses, an appropriate state includes any of: modified, owned, exclusive or shared. For write accesses, appropriate states include modified or exclusive. If the state is owned or shared, the data may be returned to the cache but an ownership request must be sent to the memory controller before the processor may complete the access. A write access to a cache also returns data. A write is performed as a read-first then modify operation.

If the L3 controller (125) needs to victimize a line to make room for the new victim, the L3 cache victim is sent to the memory system (130). However, if either a read or allocate transaction has been queued with its trace enable bit (or indicator) set, the controller (e.g., L3 controller) accesses the L3 array as usual, and also forwards the request to the memory system (130) in the same manner it would have, had the request been a read that missed, that is, where the data was not in the cache (for example, the L3 cache (120)) or a write that was marked as non-cacheable. This allows the request tagged with the trace enable bit to be captured in the TCB (140) in the memory system (130).

Figure 3:
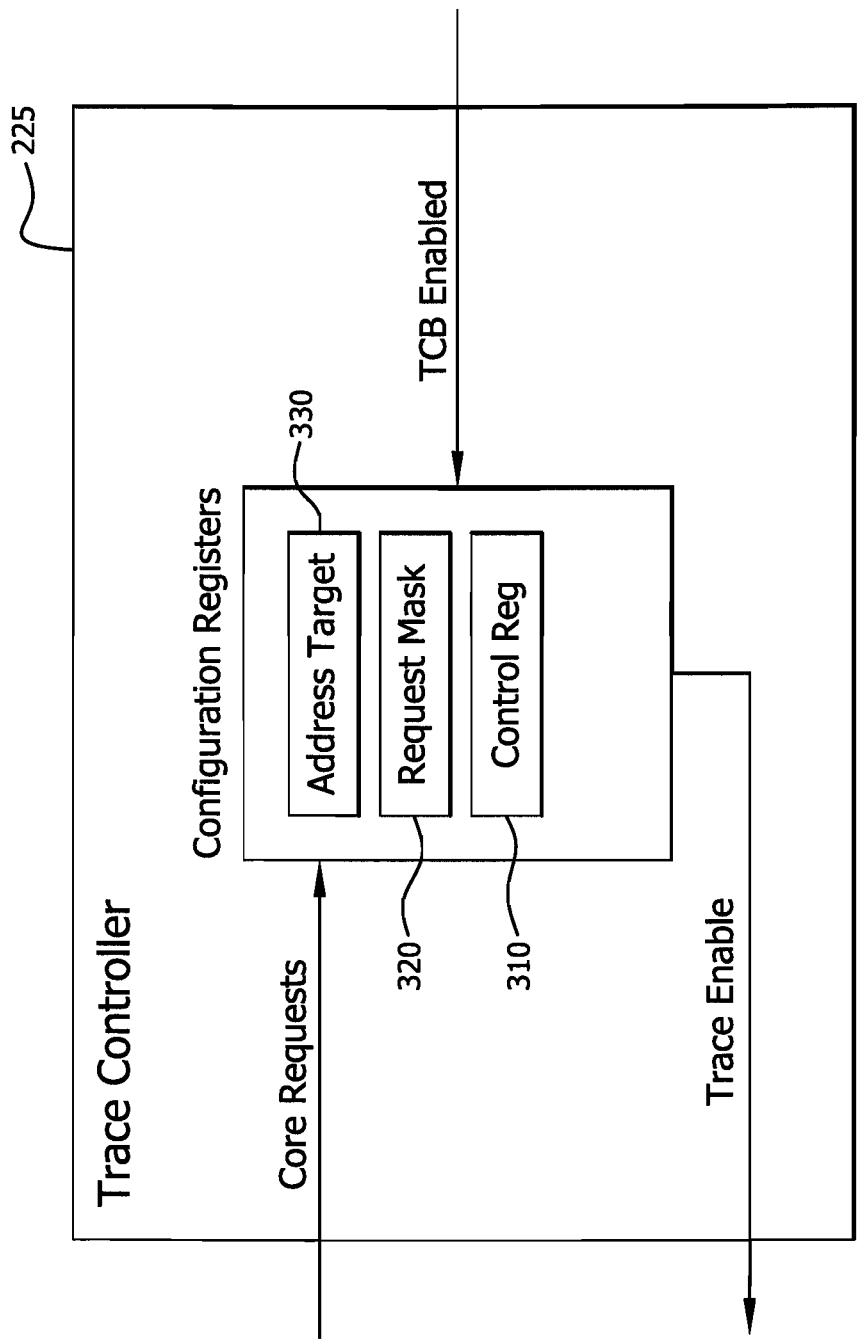
FIG. 3 shows an example trace controller of the L3 cache of FIG. 2.

The trace controller (225) is shown in more detail in FIG. 3. The trace controller (225) comprises the control register (310) which controls the operation of the trace controller (225) including selecting triggers and enabling the filter. The address target register (330) along with the request mask (320) are used to provide a filter for incoming requests. Requests which match the specified address(es) and type(s) will generate either triggers and/or cause the trace enable bit or indicator to be set according to the control register (310) configuration.

There may be a plurality of different types of transactions that the cache autonomously completes which prevents them from reaching the trace buffer. In one embodiment, there are two transaction types. The first type includes read operations that hit in the L3 cache where the cache provides the data to the core to complete the operations without the participation of the memory system (bypassing the memory system). The second is a victim line from the core's L2 cache which is written into the L3 cache and again completes the operation without forwarding the transaction to the memory system. Embodiments of this invention make these two types of transactions visible to the TCB by bypassing the L3, thereby treating them as though the read operations were misses (e.g., not cached) and the core victims were non-cacheable.

In the case of reads, the memory system may probe the system caches as necessary and extract the line from the L3 and return the data to the requesting core. This more circuitous route for the request allows it to be captured in the TCB as it is sent to the memory system, while allowing the processor to maintain coherency, albeit with a longer latency. Similarly, enabling victims to bypass the memory system allows them to be captured in the trace buffer as well. The memory system generates whatever probes of the caches are necessary to maintain coherency and writes the data to dynamic random access memory (DRAM) or similar memory device. In other words, bypassing the cache is transparent at the application level (or from the perspective of the application).

In this way, processor requests may be made visible to the TCB in a software transparent manner possibly at the expense of some performance degradation. In order to avoid filling up the available trace storage or significantly impacting performance, the bypassing of requests may be accomplished selectively according to the type of read block (e.g., a normal data read RdBlk) or line fill (a processor reading a line into its own internal cache, wherein a line is the unit of data that a cache operates on), shared line fill (RdBlkS, line fill with intent to modify (RdBlkM) or L2 dirty victim block (VicBlk) or clean victim block (WrVicBlkCl) which are indicated by a request mask register. In addition, an enable from the trace buffer itself may be used to enable the selected set of requests to be bypassed. A local trigger may also be used to enable bypassing of a preprogrammed set of request types when a specific type of request is observed relative to a particular address (via a compare with the address target register). Similarly, the trace buffer already includes a rich set of filters. These filters enable trace buffer activity to be captured and the trace buffer being enabled for capture may be used as an enable to cause the L3 to bypass the selected set of requests.

For example, the TCB receives a large number of events such as a request (e.g., a transaction) of a specific type traversing the crossbar or a probe receiving a particular transaction response from the system and it may be programmed to begin capturing trace information based on many different combinations of these events. The TCB may be programmed to begin capturing when an event or sequence of events is observed that might be relevant to the bug or condition under investigation. In this case, a signal from the TCB indicating that it has been triggered (the trace controller simply reacts to the received signal) may be used by the L3 trace controller to cause it to begin bypassing requests so that they may be captured in the TCB to aid in the debug. In other cases, it may be desirable for the L3 trace controller to autonomously begin trace bypass based on matches with incoming request types or addresses which may not otherwise be forwarded to the TCB allowing it to be triggered.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Embodiments of the invention may be represented as instructions and data stored on a computer readable memory. For example, aspects of the invention may be included in a hardware description language (HDL) code stored on such computer readable media. Such instructions, when processed may generate other intermediary data (e.g., netlists, GDS data, or the like) that can be used to create mask works that are adapted to configure a manufacturing process (e.g., a semiconductor fabrication facility). Once configured, such a manufacturing process is thereby adapted to manufacture processors or other semiconductor devices that embody aspects of the present invention.

Suitable processors include, by way of example, a general purpose processor, a special purpose processor, a conventional processor, a digital signal processor (DSP), a plurality of microprocessors, one or more microprocessors in association with a DSP core, a controller, a microcontroller, application specific integrated circuits (ASICs), graphics processing units (GPUs), field programmable gate arrays (FPGAs) circuits, any other type of integrated circuit (IC), and/or a state machine.

What is claimed:

1. A method for providing processing core request visibility comprising:
marking a memory request received at a cache controller with a trace enable bit on a condition that the memory request matches a trace controller filter;
forwarding the memory request to a memory system on a condition that the trace enable bit is marked with respect to the memory request irrespective of a higher level cache usability;
capturing the memory request in a trace capture buffer (TCB);
probing the higher level cache to satisfy the memory request and maintain cache coherency; and
returning a transaction response to a requesting processing core.

2. The method of claim 1 further comprising:
providing a local trigger based on a request type and an address to initiate a bypassing.

3. The method of claim 1 further comprising:
enabling TCB capture as a trigger to initiate a bypassing.

4. The method of claim 1 further comprising:
receiving the memory request from the requesting processor core; and
matching the memory request against trace controller filters on a condition that the memory request matches a trigger condition and bypassing is enabled.

5. The method of claim 1, wherein on a condition that a state is appropriate, the cache controller services each transaction in a request queue by looking up a transaction address in a cache array and responding with data satisfying the memory request; and
wherein for read accesses, an appropriate state includes any of: modified, owned, exclusive or shared and for write accesses, appropriate states include modified or exclusive.

6. The method of claim 1, further comprising:
on a condition that the cache controller needs to victimize a line to make room for a new victim, sending a cache victim to the memory system; and
on a condition that either a read or allocate transaction is queued with its trace enable bit set, the controller forwards the memory request to the memory system whether or not the data was in the cache, capturing the memory request tagged with the trace enable in a trace capture buffer (TCB) in the memory system.

7. The method of claim 1, further comprising:
bypassing requests being selective based on at least one of: read block, line fill, shared line fill, line fill with intent to modify, dirty victim block or clean victim block.

8. The method of claim 7 wherein an enable from a trace capture buffer (TCB) enables a selected set of memory requests to be bypassed.

9. The method of claim 1, wherein a local trigger enables bypassing of a preprogrammed set of memory request types on a condition that a predefined type of memory request occurs relative to a predefined address.

10. The method of claim 1, wherein the TCB includes a set of filters enabling capture of TCB activity, wherein the enabling causes selected memory requests to be bypassed.

11. An apparatus comprising:
a trace controller configured to mark a memory request received at a cache controller with a trace enable bit on a condition that the memory request matches a trace controller filter;
the cache controller configured to forward the memory request to a memory system on a condition that the trace enable bit is marked with respect to the memory request irrespective of a higher level cache usability;
a trace capture buffer (TCB) configured to capture the memory request;
a memory controller configured to probe the higher level cache to satisfy the memory request and maintain cache coherency; and
the memory controller configured to return a transaction response to a requesting processing core.

12. The apparatus of claim 11 further comprising:
a cache controller configured to receive a memory request from a requesting processor core;
a trace controller configured to match the memory request against trace controller filters on a condition that the memory request matches a trigger condition and bypassing is enabled;
a control register configured to control operation of the trace controller including trigger selection and filter enablement; and
an address target register and request mask configured to provide a filter for memory requests which match at least one specified address or at least one type of memory request to perform at least one of: generate at least one trigger, or set a trace enable bit corresponding to a control register configuration.

13. The apparatus of claim 11 further comprising:
on a condition that the cache controller needs to victimize a line to make room for a new victim, the cache controller is configured to send a cache victim to the memory system; and
on a condition that either a read or allocate transaction is queued with its trace enable bit set, the cache controller forwards the memory request to the memory system whether or not the data was in the cache, capturing the memory request tagged with the trace enable in a trace capture buffer (TCB) in the memory system.

14. The apparatus of claim 13, wherein an enable from the TCB enables a selected set of memory requests to be bypassed.

15. The apparatus of claim 13, wherein a local trigger enables a preprogrammed set of memory request types to be bypassed on a condition that a predefined type of memory request occurs relative to a predefined address.

16. The apparatus of claim 13, wherein the TCB includes a set of filters enabling capture of TCB activity, wherein the enabling causes selected memory requests to be bypassed.

17. The apparatus of claim 11, wherein the trace controller is further configured to provide a local trigger based on a request type and an address to initiate a bypass.

18. The apparatus of claim 11, wherein the trace controller is further configured to enable TCB capture as a trigger to initiate a bypassing.

19. A non-transitory computer-readable storage medium storing a set of instructions for execution by a general purpose computer to provide core request visibility, the set of instructions comprising:
a marking code segment for marking a memory request received at a receiving code segment with a trace enable bit on a condition that the memory request matches a trace controller filter;

a forwarding code segment for forwarding the memory request to a memory system on a condition that the trace enable bit is marked with respect to the memory request irrespective of a higher level cache usability;
a capture code segment for capturing the memory request in a trace capture buffer (TCB);
a probing code segment for probing the higher level cache to satisfy the memory request and maintain cache coherency; and
a return code segment for returning a transaction to a requesting processor core.

20. The non-transitory computer-readable storage medium of claim 19, wherein the instructions are hardware description language (HDL) instructions used for the manufacture of a device.

* * * * *